June 23, 1964 R. G. HARMON 3,138,436
APPARATUS FOR MONITORING CHEMICAL REACTIONS
Filed June 3, 1960

INVENTOR.
RAYMOND G. HARMON
BY
ATTORNEY

United States Patent Office

3,138,436
Patented June 23, 1964

3,138,436
APPARATUS FOR MONITORING CHEMICAL REACTIONS
Raymond G. Harmon, Charleston, W. Va., assignor to Union Carbide Corporation, a corporation of New York
Filed June 3, 1960, Ser. No. 33,749
5 Claims. (Cl. 23—253)

The instant invention relates to a novel method and apparatus for determining the product composition of a process flow stream. More particularly it relates to such method and apparatus for determining said composition by measuring temperature variations of said stream.

In the chemical industry many continuous operating processes require analytical instruments to control the operation of units or continuously record impurity or product concentrations. These instruments are particularly needed in processes where an exothermic decomposition of the impurity becomes a dangerous explosive substance which must be controlled below a specific concentration and temperature. In the design of automatic equipment for either controlling such processes or keeping continuous records of product concentrations, tests indicative of the process parameter or product it is desired to monitor must be developed. These tests must additionally be adapted to some sort of substantially continuous measurement procedure as well as an instrument designed to accurately make the test. Further, the instrument must be capable of making the test without introducing additional hazards when associated with potentially dangerous reaction products.

By presently used control methods, an operator is required to make preliminary tests on the unit product at timed intervals to determine the approximate impurity concentration. These tests are not strictly accurate and therefore, samples must be sent to the laboratory for analysis as a control measure. In many cases this information is received too late to help smooth out the unit operation or prevent undesirable or dangerous conditions. Labratory analysis as a rule takes approximately one hour to complete while the process requires an instrument which will render the same information in less than 15 minutes if proper corrective measures are to be taken.

It is accordingly a primary object of this invention to provide a method and apparatus for monitoring exothermic and endothermic chemical reactions.

It is a further object to provide such a method and apparatus capable of safely handling potentially dangerous reaction products thereof.

It is a still further object to provide such a method and apparatus capable of making accurate measurements in a relatively short time.

Other objects and advantages will be apparent from the description and drawings in which.

The objects of the present invention are accomplished by sensing the temperature of a fluid reactant mixture at a first point in the reactant flow stream, subsequently sensing the temperature of the same reactant mixture at a point downstream from the first point, and developing a signal proportional to the temperature differential between the two points.

It has been found that impurities and product concentrations in certain exothermic and endothermic chemical reactions can be determined by measuring successive temperature variations. Such temperature variations can be used to tell whether any reactant is present by the mere occurrence of a variation or how much reactant is present by the amount of variation in a given time. The magnitude of the variation can be indicated or recorded on suitable equipment.

According to the present invention novel apparatus has been provided for measuring and obtaining an indication of these variations which comprises two thermally responsive elements which are connected into a suitable electrical circuit such as a Wheatstone bridge. The resultant electrical signal is an indication of any desired temperature gradient.

The two elements are preferably located in a body member or cell. The construction of the cell is such that the fluid passes through a small passage in which the first thermally responsive element is located and from thence through a larger chamber, known as a residence chamber and lastly through a third chamber in which is located a second thermally responsive element. The first thermally responsive element measures the temperature of the entering fluid and the second measures the temperature of the effluent fluid. The measured temperature difference is proportional to the intensity of an endothermic or exothermic reaction taking place between the two thermally responsive elements immersed in the flowing fluid as indicated. The flowing sample residence time in the cell is governed by the type of reaction that is expected to take place in the cell, the volume of the cell, and also the allowable temperature rise permitted for safe operation. Therefore, the sample flow is closely controlled by a metering pump and is set and maintained at a rate which accommodates this correct residence time.

Figure 1:
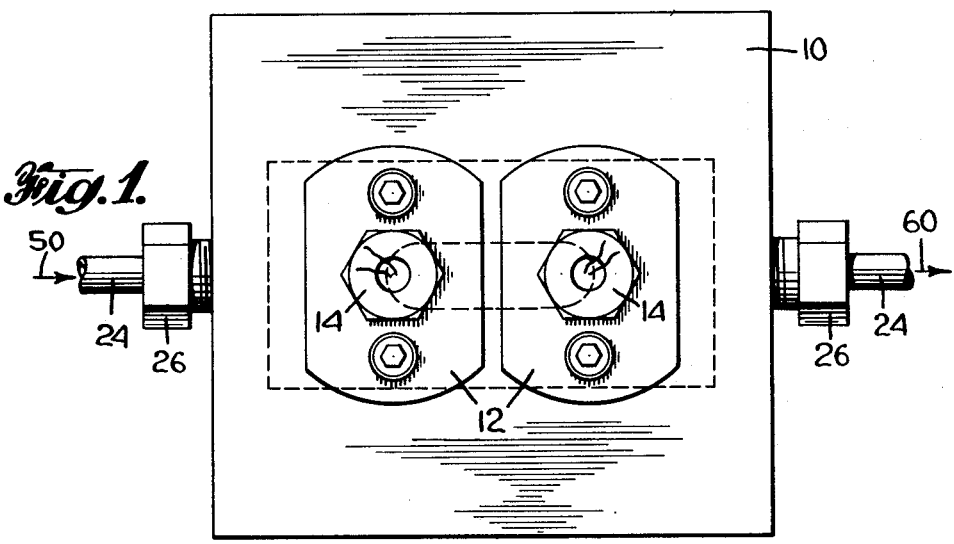
FIG. 1 is a plan view of a thermal testing cell embodying the instant method and apparatus.
Figure 2:
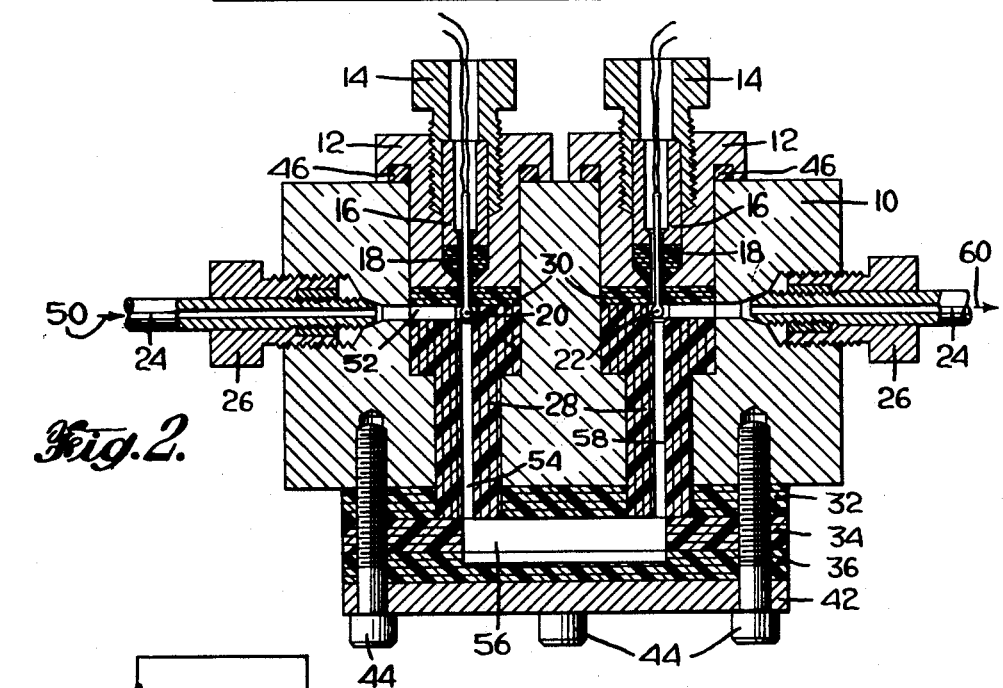
FIG. 2 is a cross-sectional side view of the cell of FIG. 1.

The invention will now be more specifically described with reference to the drawings in which like reference numerals refer to like portions of the apparatus. FIGS. 1 and 2 show plan and cross-sectional views of a preferred measuring cell having the two temperature sensing elements mounted therein. The cell comprises a block 10 of thick wall metal to withstand high pressures and is provided with heads 12 in which the thermally responsive element assemblies are located. The assemblies include compression nuts 14 containing the ferrules 16, Teflon seals 18, and bead thermistors 20 and 22. The inlet and outlet of the cell contains heavy wall tubings 24, fitted to seal into the inlet and outlet compression nuts 26. These lead to and from the insulating inserts 28 also made of Teflon. It may be mentioned here that Teflon (a Du Pont trade name) was found to be a very good insulating and corrosion resistant material. Above the insulated inserts are located insulating caps 30 made of Teflon and sealed against the heads 12. The bottom section of the cell consists of an insulating base block 32, an insulating capacity block 34, and the insulated bottom cap 36 fitted to the insulated capacity block 34. The insulating capacity block 34 contains chamber 56 therein which serves as a residence chamber and can be made to any dimension that will give the proper residence time to the sample to obtain the best results. The bottom plate or follower 42 is made of metal and holds the Teflon blocks intact by the compression screws 44. The gaskets 46 are used to seal the heads containing the thermally responsive resistance element assemblies to the cell block which prevents the sample from leaking to the atmosphere when the cell is used in high pressure systems.

The thermally responsive elements are preferably bead thermistors; however, thermocouples, resistant thermometers, thermopiles or the like could be used with only slight modifications of the apparatus.

In operation a sample passes through the inlet 50 and then through small passage 52 where the sample comes in contact with the first thermally responsive element 20 and downward through a thermally insulated channel 54 into the residence chamber 56 where the flow rate is reduced because of the greater cross-sectional area of the chamber, permitting the fluid in the residence chamber to experience an increased thermal change because of this increased residence time of the fluid between the two thermally responsive resistance elements. The fluid flows out of residence chamber 56 and on through insulated channel 58. The heat generated or absorbed by the reacting sample and the sample itself, passes on to the second thermistor 22 where the temperature of the sample is again measured. The first and second thermistors are connected into a conventional 4-arm Wheatstone bridge circuit in a preferred embodiment of the invention whose output readings or unbalance may be calibrated into known quantities of products. The outlet 60 is preferably connected to the suction side of a precision pump because there is less danger of sample contamination and also the volume of the pump chamber does not become a factor in the overall response rate of the analyzer. The exhausted sample can be discharged into a product, drain, or vent line.

Figure 3:
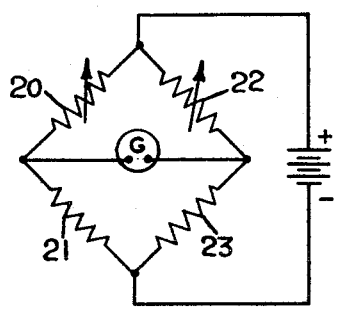
FIG. 3 is a schematic diagram of an instrument circuit embodying the present invention.

A simplified version of the bridge circuit having the temperature responsive resistance elements 20 and 22 connected therein is illustrated in FIG. 3. The elements 20 and 22, illustrated as being variable, are connected in opposite legs of the bridge circuit while fixed resistances 21 and 23 are located in the other two legs. The two resistances 21, 23 are chosen so that the bridge circuit will be in balance when the resistances of elements 20 and 22 are equal or when their temperatures are the same. Any change of temperature occurring between the elements 20 and 22 will be indicated by an unbalance of the bridge circuit which will be accompanied by current flow through the galvanometer G. The amount of unbalance current is proportional to the resistance difference between elements 20 and 22 and thus to the temperature difference between the fluid in the two measuring zones. While a galvanometer has been shown and described as the simplest means for measuring the bridge unbalance, the unbalance signal could be amplified and fed to an indicator capable of more accurate indications or to a recorder.

The bead thermistors can be replaced by two thermal generators such as thermocouples or thermopiles which are preferably connected in series with opposing polarities. This arrangement will produce a useful signal proportional to the temperature difference which can be indicated or recorded on a standard potentiometer or recorder without the necessity of a separate power supply for the measuring circuit. The choice between thermocouples and the like and thermally resistance elements is determined by the degree of sensitivity desired.

In a typical operating example of the present invention it is used to monitor the production of peracetic acid from acetaldehyde-monoperacetate (AMP). In order to minimize the amount of AMP remaining in the end product, it is raised to a temperature of 60° C. so that the AMP content will exothermically react to produce acetic acid. It was found that a satisfactory quantative measure of the AMP was possible when the temperature was measured at each end of the section of the flowing system which would permit a two-minute residence time for the AMP flowing through it. Therefore, as described previously, the rate of flow of the sample into the instant thermal cell is such that is has a two-minute residence time in its passage therethrough. It is thus possible to tell if the initial reaction to peracetic acid is going desirably near completion and also if there is a dangerous condition present in the exhaust stream from the process due to excessive amounts of the unstable AMP being discharged therewith.

The invention, although developed for the purpose of measuring the exothermic decomposition impurity in a product at about 60° F., can be used also to measure temperature differentials in any exothermic or endothermic reactions and then convert the measurement to read in any concentration unit desired when calibrated for known quantities of product, etc. As an example, an exothermic reaction to form a product can be described in the following way: In the nitration of benzene the heat released is equivalent to 791 B.t.u. per pound of benzene nitrated. Careful temperature control with cooling coils is necessary for the control of this process but this obscures any measurement of the approach to completion of the process. If a sample is withdrawn into the thermal cell of the analyzer of this invention and then allowed to complete its reaction, the temperature will increase in proportion to the concentration of the unreacted nitric acid in the reactor. The differential heat generated during this reaction is a measure of the unreacted acid and hence by difference the product concentrations in the unit. The reaction is:

$$C_2H_6 + NHO \rightarrow C_6H_5NO_2 + H_2O$$

where $\Delta H = 34.3$ kg. col.

From the above description and drawings it may readily be seen that the instant invention is useful in monitoring chemical reactions involving heat loss or gain. Moreover, its use is possible where only minute temperature differentials are measured. These temperature readings can be amplified through auxiliary circuitry to give very large range calibrations for use in product or impurity concentration measurements and thus provide a valuable addition to the field of automatic process control.

While certain preferred embodiments of the invention have been shown and described, it is to be understood that certain modifications and substitutions could be made by a person skilled in the art without departing from the spirit and scope thereof.

What is claimed is:

1. A thermal measuring cell for use in determining temperature differentials in a multi-component flowing fluid stream, the components of which react with an accompanying temperature change, which cell comprises a body member having therein a first chamber containing a first sensing element whose electrical resistance is proportional to temperature, a second chamber of greater cross-sectional area than and connected to the first chamber wherein which said second chamber velocity of the stream flowing therethrough is reduced to a predetermined extent sufficient to effect a reaction-induced temperature change therein, a third chamber connected to the second chamber and containing a second sensing element whose electrical resistance is proportional to temperature, electrical leads connected to both said sensing elements, and fluid sample inlet and outlet means connected to the first and third chambers respectively.

2. A thermal measuring cell as set forth in claim 1 wherein the entire flow path for the fluid sample within the cell body member is lined with a highly thermally insulative material.

3. A thermal measuring cell as set forth in claim 2 wherein the sensing elements are bead thermistors.

4. A thermal measuring cell which comprises a body member having an inlet passage therein of a relatively small cross-sectional area, a temperature sensitive resistance element located in said inlet passage, said inlet passage connecting with one end of a residence chamber of substantially greater cross-sectional area than said inlet passage, said residence chamber being located in series flow relationship between said inlet passage and an outlet passage, an outlet passage connecting with the residence chamber at the other end thereof, said outlet passage having substantially the same cross-sectional area as said inlet passage, a second temperature sensitive resistance element in said outlet passage, the two passages and the residence chamber being lined with a highly heat insulative material between the two resistance elements to minimize heat loss.

5. A measuring cell as set forth in claim 1 wherein the residence chamber and the body member are separate units, and wherein means are provided for substituting residence chambers of different cross-sectional areas where different residence times are desired.

References Cited in the file of this patent
UNITED STATES PATENTS

| | | |
|---|---|---|
| 1,627,204 | Ruben | May 3, 1927 |
| 1,664,951 | Rodhe | Oct. 11, 1927 |
| 2,591,195 | Picciano | Apr. 1, 1952 |
| 2,687,036 | Minter | Aug. 24, 1954 |
| 2,848,306 | Blumer | Aug. 19, 1958 |
| 2,916,358 | Valentine et al. | Dec. 8, 1959 |
| 2,950,176 | Thayer et al. | Aug. 23, 1960 |